United States Patent
Guo et al.

(10) Patent No.: US 6,950,210 B2
(45) Date of Patent: Sep. 27, 2005

(54) METHOD AND APPARATUS FOR ADAPTIVELY BINARIZING COLOR DOCUMENT IMAGES

(75) Inventors: Jinhong K. Guo, Windsor, NJ (US); Yichun Zhang, Webster, NY (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 848 days.

(21) Appl. No.: 09/990,096

(22) Filed: Nov. 21, 2001

(65) Prior Publication Data

US 2003/0095270 A1 May 22, 2003

(51) Int. Cl.[7] .......................... H04N 1/40; G06K 15/00
(52) U.S. Cl. .................... 358/3.24; 359/1.9; 359/3.06; 359/3.21
(58) Field of Search .................... 358/1.9, 2.1, 3.14, 358/3.06, 3.22, 3.24, 3.02; 382/261, 265

(56) References Cited

U.S. PATENT DOCUMENTS

| | | | |
|---|---|---|---|
| 4,823,194 A | 4/1989 | Mishima et al. | |
| 5,138,671 A | 8/1992 | Yokoyama | |
| 5,184,213 A | 2/1993 | Ishida | |
| 5,200,841 A | 4/1993 | Kotaki et al. | |
| 5,201,012 A | 4/1993 | Hisano et al. | |
| 5,268,773 A | * 12/1993 | Park et al. | 358/466 |
| 5,452,107 A | * 9/1995 | Koike | 358/468 |
| 5,621,815 A | 4/1997 | Talukdar et al. | |
| 5,784,500 A | 7/1998 | Homma et al. | |
| 5,838,463 A | 11/1998 | Gahang | |
| 5,915,049 A | 6/1999 | Kaji et al. | |
| 5,949,901 A | 9/1999 | Nichani et al. | |
| 6,055,336 A | 4/2000 | Niki | |
| 6,061,476 A | 5/2000 | Nichani | |
| 6,072,907 A | 6/2000 | Taylor et al. | |
| 6,192,163 B1 | 2/2001 | Murayama | |
| 6,195,467 B1 | * 2/2001 | Asimopoulos et al. | 382/261 |
| 6,498,660 B2 | * 12/2002 | Haltmaier | 358/2.1 |

OTHER PUBLICATIONS

Gonzalez and Woods, Digital Image Processing, Section 7.3, pp. 443–458, 1992.
Academic Press Limited, Machine Vision, Section 4.3, pp. 79–99, 1990.

* cited by examiner

*Primary Examiner*—Thomas D. Lee
*Assistant Examiner*—James A Thompson
(74) *Attorney, Agent, or Firm*—Harness, Dickey & Pierce, PLC (57) ABSTRACT

A method for binarizing an image that includes initializing, for each column of the image, a first set of variables representing a local column low pixel value and a local column high pixel value, and, for each row of the image, a second set of variables representing a local row low pixel value and a local row high pixel value. The following steps are iterated for each pixel: determining a threshold value dependent upon the first and second sets of variables at the current pixel location, comparing a value representative of an image pixel at the current pixel location with the determined threshold value, and setting a binarization pixel for the current pixel location to one of two values, dependent upon results of the comparison, and adjusting values included in the first set of variables and the second set of variables dependent upon the results of the comparison.

30 Claims, 3 Drawing Sheets

METHOD AND APPARATUS FOR ADAPTIVELY BINARIZING COLOR DOCUMENT IMAGES

FIELD OF THE INVENTION

The present invention relates to methods and apparatus for binarizing images, and more particularly to methods and apparatus for binarizing color or gray scale images under complex backgrounds.

BACKGROUND OF THE INVENTION

Optical character recognition (OCR) of black-and-white images is known. However, the popularity of color documents has created a need for text recognition of gray level and/or color characters, often with a complex background. For example, text with background of this type may often be found in advertisements and magazine articles. Sometimes, text is encountered that is on a complex textured background, or the background gradually changes from one color to another. This type of background is difficult to handle with traditional global thresholding methods.

More particularly, global thresholding methods are utilized in at least one current optical character recognition (OCR) software package. The generation of a single global threshold for an entire image is fast and simple. However, a global threshold provides satisfactory results only when an image has a highly even background. Even with user intervention, OCR software with global thresholding cannot handle images with uneven illumination or complicated backgrounds such as a textured background.

SUMMARY OF THE INVENTION

One configuration of the present invention therefore provides a method for binarizing an image having N columns and M rows of pixels and a first column forming a first edge of the image, a last column forming a second edge of the image opposite the first edge, a first row of the image forming a third edge of the image and a last row of the image forming a fourth edge of the image opposite the third edge. The method, which produces an array of binarized pixels, includes:

(a) initializing, for each column of the image, a first variable representing a local column low pixel value and a second variable representing a local column high pixel value, and, for each row of the image, a third variable representing a local row low pixel value and a fourth variable representing a local row high pixel value;

(b) iteratively repeating steps (c) through (f) for each column of the image, from the first column to the last column;

(c) iteratively repeating steps (d) through (f) for each row of the image, from the first row to the last row;

(d) determining a threshold value dependent upon the first variable and the second variable at the column of the location index, and upon the third variable and the fourth variable at the row of the location index, the location index being dependent upon the iterated column and the iterated row;

(e) comparing a value representative of an image pixel at the location index with the determined threshold value, and (f) setting a binarization pixel for the location index to either a first value or a second value, dependent upon results of the comparison, and adjusting values of either the first variable and the third variable, or the second variable and the fourth variable dependent upon the results of the comparison.

Another configuration of the present invention provides a computing apparatus for binarizing an image having N columns and M rows of pixels and a first column forming a first edge of the image, a last column forming a second edge of the image opposite the first edge, a first row of the image forming a third edge of the image and a last row of the image forming a fourth edge of the image. The computing apparatus includes a memory and a processor operatively coupled to the memory for reading and storing values therein, and the computing apparatus is configured to:

(a) initialize in the memory, for each column of the image, a first variable representing a local low first direction pixel value and a second variable representing a local high first direction pixel value, and, for each row of the image, a third variable representing a local low second direction pixel value and a fourth variable representing a local high second direction pixel value;

(b) iteratively repeat (c) through (f) for each column of the image, from the first column to the last column;

(c) iteratively repeat (d) through (f) for each row of the image, from the first row to the last row;

(d) determine a threshold value dependent upon the first variable and the second variable at the column of the location index, and upon the third variable and the fourth variable at the row of a location index, the location index being dependent upon the iterated column and the iterated row;

(e) compare a value representative of an image pixel at the location index with the determined threshold value, and (f) store, in the memory, a binarization pixel for the location index to either a first value or a second value, dependent upon results of the comparison, and adjust stored values of either the first variable and the third variable, or the second variable and the fourth variable dependent upon the results of the comparison, wherein the iterations (b) and (c) produce an array of binarization pixels stored in the memory.

Yet another configuration of the present invention provides a machine readable medium or media having recorded thereon instructions configured to instruct a computing apparatus having a memory and a processor operatively coupled to the memory for reading and storing values therein to:

(a) initialize in the memory, for each column of an image having N columns and M rows of pixels and a first column forming a first edge of the image, a last column forming a second edge of the image opposite the first edge, a first row of the image forming a third edge of the image and a last row of the image forming a fourth edge of the image, a first variable representing a local low first direction pixel value and a second variable representing a local high first direction pixel value, and, for each row of the image, a third variable representing a local low second direction pixel value and a fourth variable representing a local high second direction pixel value;

(b) iteratively repeat (c) through (f) for each column of the image, from the first column to the last column;

(c) iteratively repeat (d) through (f) for each row of the image, from the first row to the last row;

(d) determine a threshold value dependent upon the first variable and the second variable at the column of the location index, and upon the third variable and the fourth variable at the row of a location index, the location index being dependent upon the iterated column and the iterated row;

(e) compare a value representative of an image pixel at the location index with the determined threshold value, and (f) store, in the memory, a binarization pixel for the location index to either a first value or a second value, dependent upon results of the comparison, and adjust stored values of either the first variable and the third variable, or the second variable and the fourth variable dependent upon the results of the comparison, wherein the iterations (b) and (c) produce an array of binarization pixels stored in the memory.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
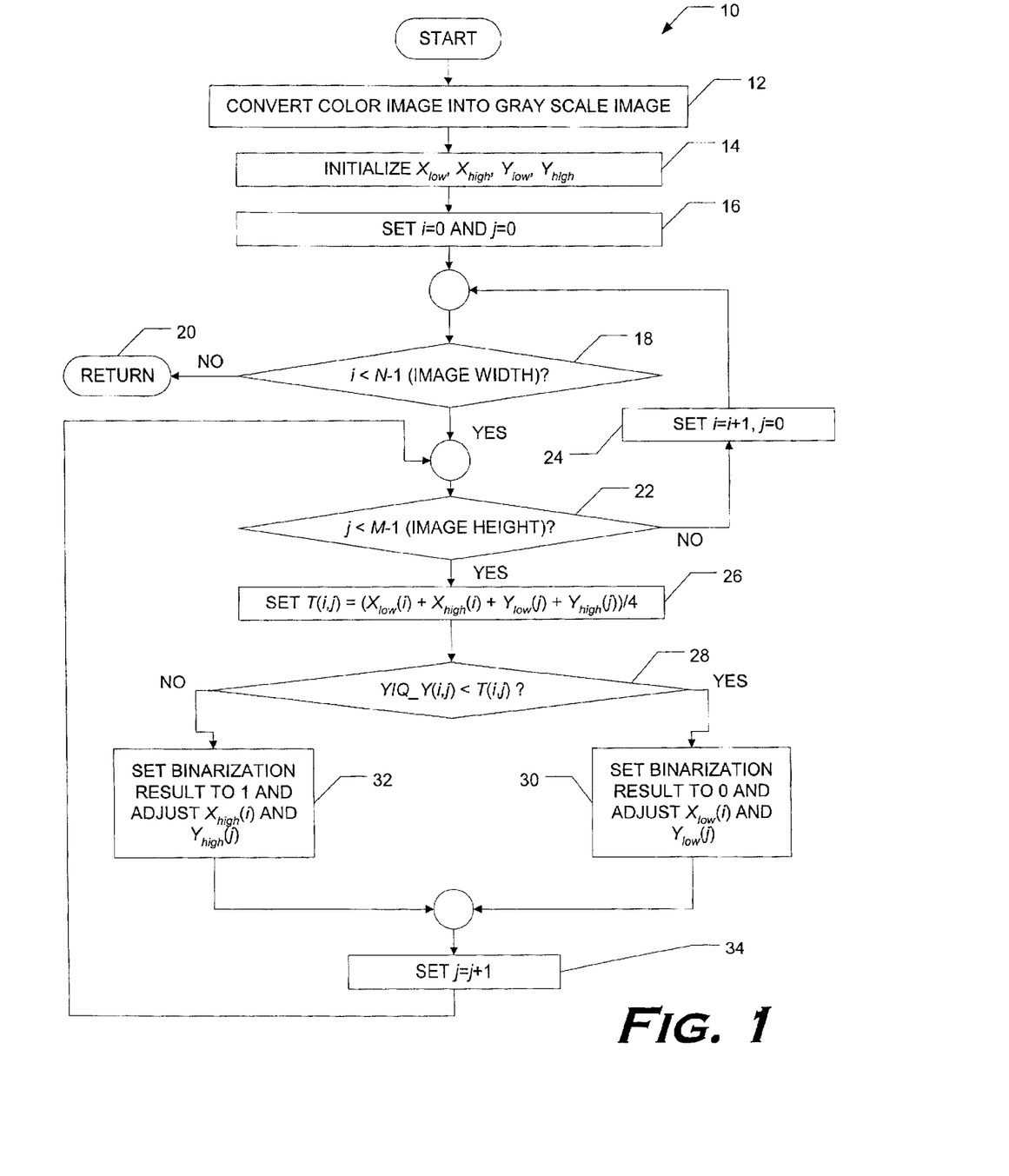
FIG. 1 is a drawing of a flow chart illustrating one configuration of a method for binarizing a color image.

Referring to FIG. 1, one configuration 10 of the present invention embeds a self-learning process in the binarization of color or gray scale images under various complex backgrounds.

It has been found that, for many documents having complex backgrounds, the background of a document normally changes gradually as it is scanned, except for transitions from text to reversed text, and vice versa. If a pixel is in a darker area, the probability of the subsequent pixel being in a darker area is relatively higher as a result of correlation of color backgrounds in a surrounding area. Using this assumption, if a scan process is going through a low contrast area, the threshold for the next neighboring pixel is adjusted lower, as well.

Thus, in one configuration and referring to FIG. 1, a document that has been scanned in color is converted to a gray scale image 12. For example, an RGB image (i.e., one in which each pixel is represented by an R (red) value, a G (green) value, and a B (blue) value) is converted to YIQ format. The YIQ_Y value representing luminance or gray scale value is used for binarization. (YIQ formats are known from the NTSC color television standard, in which "Y" is a perceived luminance signal, "I" is a color difference signal derived from R-Y, and "Q" is a color difference signal derived from B-Y, where "R" is a red signal and "B" is a blue signal. As used herein, the luminance signal or grayscale value is denoted YIQ_Y.)

In configurations utilizing grayscale rather than color images, no conversion 12 to YIQ is necessary, as the gray values of pixels are used directly.

For an image of N pixels in a first direction by M pixels in a second, perpendicular direction, memory locations for the following variables are assigned and initialized 14:

$$X_{low}(i), i=0, \ldots, N-1$$
$$X_{high}(i), i=0, \ldots, N-1$$
$$Y_{low}(j), j=0, \ldots, M-1$$
$$Y_{high}(j), j=0, \ldots, M-1 \quad (1)$$

where:

i is an index, ranging from 0 to N-1, of a column in the image;

j is an index, ranging from 0 to M-1, of a row in the image;

$X_{low}$ (i) is a local low column value;

$X_{high}$ (i) is a local high column value;

$Y_{low}$ (j) is a local low row value;

$Y_{high}$ (j) is a local high row value.

Figure 2:
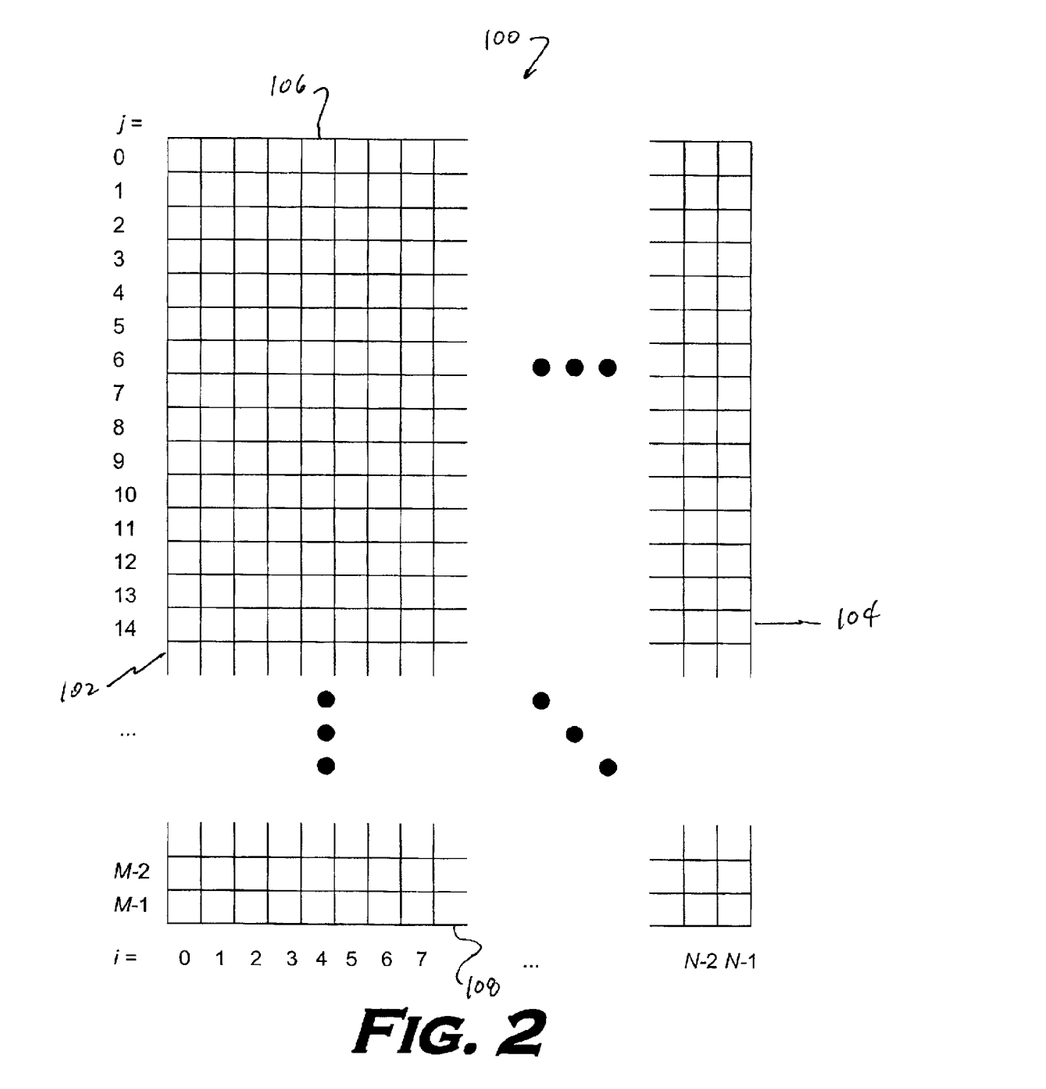
FIG. 2 is a representation of the arrangement of pixels in an image, such as that used as input to the method represented in FIG. 1.

FIG. 2 is an illustration showing an orientation of a rectangular image 100 showing the first column (column number 0) forming a first edge 102 of image 100 and the last column (column number N-1) forming a second edge 104 opposite first edge 102. Similarly, the first row (row number 0) forms a third edge 106 of image 100 and the last row (row number M-1) forms a fourth edge 108 opposite edge 106. This mapping is somewhat arbitrary, in that the rows and/or columns may be numbered in the reverse order, and the image may be rotated 90 degrees (i.e., the roles of the rows and columns may be interchanged) in either direction, as long as the resultant mapping is consistently used throughout the method. However, for explanatory purposes, the mapping shown in FIG. 2 will be assumed throughout.

In one configuration, initializing 14 the local variables is performed utilizing minimum and maximum values of luminosity YIQ_Y from the YIQ representation of the scanned image. Initialization 14 of the local variables is thus determined utilizing relationships written as:

$$X_{low}(i)=YIQ\_Y_{min}, i=0, \ldots, N-1$$
$$X_{high}(i)=YIQ\_Y_{max}, i=0, \ldots, N-1$$
$$Y_{low}(j)=YIQ\_Y_{min}, j=0, \ldots, M-1$$
$$Y_{high}(j)=YIQ\_Y_{max}, j=0, \ldots, M-1 \quad (2)$$

where:

$$YIQ\_Y_{min}=\text{minimum}\{YIQ\_Y(i,j)\}, i=0, \ldots, N-1, j=0, \ldots, M-1$$
$$YIQ\_Y_{max}=\text{maximum}\{YIQ\_Y(i,j)\}, i=0, \ldots, N-1, j=0, \ldots, M-1; \quad (3)$$

i.e., $YIQ\_Y_{min}$ is the minimum luminosity in the N by M image, $YIQ\_Y_{max}$ is a maximum luminosity in the N by M image, and $YIQ\_Y(i,j)$ is the intensity of a pixel of the image at an index i and an index j.

A set of nested loops is used to iterate over each pixel at a location index (i,j) in the YIQ-representation of the scanned image and to return 20 a binarized image when the iteration is complete. In the configuration represented in FIG. 1, variables i and j are set 16 to zero, and a test 18 is performed to determine whether i has iterated over the entire width of the image. If it has, the iterations are complete, and a binarized image is returned 20. Otherwise, a test 22 is performed to determine whether j has iterated over the entire image height at the current index i. If it has, the i index is increased 24 and another loop over j is performed, provided that i has not iterated 18 over the entire width of the image.

Otherwise, at the location (i,j), a determination 26 of a local threshold T(i,j) is made, utilizing a relationship written as:

$$T(i,j)=(X_{low}(i)+X_{high}(i)+Y_{low}(j)+Y_{high}(j))/4. \quad (4)$$

The Y-value YIQ_Y(i,j) at the corresponding location (i,j) is compared 28 to this local threshold. Thus, if:

$$YIQ\_Y(i,j)<T(i,j) \quad (5)$$

then 30:

$$B(i,j)=0$$

$$X_{low}(i)=(X_{low}(i)*w+YIQ\_Y(i,j))/(w+1)$$

$$Y_{low}(j)=(Y_{low}(j)*w+YIQ\_Y(i,j))/(w+1) \quad (6)$$

else 32:

$$B(i,j)=1$$

$$X_{high}(i)=(X_{high}(i)*w+YIQ\_Y(i,j))/(w+1)$$

$$Y_{high}(j)=(Y_{high}(j)*w+YIQ\_Y(i,j))/(w+1) \quad (7)$$

where:
* (asterisk) represents multiplication,
B(i,j) is the determined binarized image pixel at location index (i,j) that is stored in memory; and
w is a parameter.

In one configuration, a B(i,j) value of 0 is mapped to black and a value of 1 is mapped to white. However, in another configuration, a different, but consistent mapping is applied.

Threshold T(i,j) adaptively changes as the image is scanned, as will be appreciated by observing that changes in either $X_{low}(i)$ and $Y_{low}(j)$, or in $X_{high}(i)$, and $Y_{high}(j)$ the occur, depending upon the consequences 30, 32 of each threshold comparison 28. Also, because of the updates made to $X_{low}(i)$, $Y_{low}(j)$, $X_{high}(i)$, and $Y_{high}(j)$ during binarization of the image, their values at any particular (i,j) pixel location do not necessarily represent actual minimum and maximum values of luminosity, either globally or locally.

Parameter w in one configuration is a user-adjustable parameter that may be thought of as defining a "localization region" for $X_{low}(i)$, $Y_{low}(j)$, $X_{high}(i)$, and $Y_{high}(j)$. However, parameter w is not required to be adjustable in all configurations of the present invention. In one configuration, parameter w is made dependent upon image resolution. Those skilled in the art will recognize that the changes to $X_{low}(i)$, $Y_{low}(j)$, $X_{high}(i)$, and $Y_{high}(j)$ represent an operation utilizing a computational kernel. The kernel described by the equations above depends only on the current location index values of i and j, but in other configurations, other kernels are utilized that include dependencies on weighted values of $X_{low}$, $Y_{low}$, $X_{high}$, and $Y_{high}$ at additional rows or columns, such as adjacent rows and columns.

The more pixels that are processed, the more reliable threshold T(i,j) becomes for binarization. The reliability of values of $X_{low}(i)$, $Y_{low}(j)$, $X_{high}(i)$, and $Y_{high}(j)$ for determining each value of T(i,j) also increase.

To further enhance performance in one configuration of the present invention, in one configuration, after the initialization 14 of the local variable but prior to the looping iterations (e.g., between steps 14 and 16 in FIG. 1), a pre-training process is applied to variables $X_{low}(i)$, and $X_{high}(i)$, and variables $Y_{low}(j)$, and $Y_{high}(j)$. The following pseudo-code describes four separate pre-training procedures, where A_1, A_2, A_3, and A_4 are labels for each procedure:

A_1: for i=N_1 to i=N_2
    for j=M_1 to j=M_2
      if YIQ_Y(i,j)<($X_{low}(i)$+$X_{high}(i)$)/2
        then $X_{low}(i)$=($X_{low}(i)$*w+YIQ_Y(i,j))/(w+1)
        else $X_{high}(i)$=($X_{high}(i)$*w+YIQ_Y(i,j))/(w+1)
A_2: for i=N_2 down to i=N_1
    for j=M_2 down to j=M_1
      if YIQ_Y(i,j)<($X_{low}(i)$+$X_{high}(i)$)2
        then $X_{low}(i)$=($X_{low}(i)$*w+YIQ_Y(i,j))/(w+1)
        else $X_{high}(i)$=($X_{high}(i)$*w+YIQ_Y(i,j))/(w+1)
A_3: for i=N_1 to i=N_2
    for j=M_1 to j=M_2
      if YIQ_Y(i,j)<($Y_{low}(i)$+$Y_{high}(i)$)2
        then $Y_{low}(j)$=($Y_{low}(j)$*w+YIQ_Y(i,j))/(w+1)
        else $Y_{high}(j)$=($Y_{high}(j)$*w+YIQ_Y(i,j))/(w+1)
A_4: for i=N_2 down to i=N_1
    for j=M_2 down to j=M_1
      if YIQ_Y(i,j)<($Y_{low}(i)$+$Y_{high}(i)$)/2
        then $Y_{low}(j)$=($Y_{low}(j)$*w+YIQ_Y(i,j))/(w+1)
        else $Y_{high}(j)$=($Y_{high}(j)$*w+YIQ_Y(i,j))/(w+1)

In one configuration of the present invention, pre-training is performed by performing all four pre-training procedures A_1, A_2, A_3, and A_4. In other configurations, two pre-training procedures are performed, namely, one procedure selected from procedures A_1 and A_2, and another procedure selected from A_3, and A_4. (For example, in one such configuration, pre-training procedures A_1 and A_3 are performed.) Such configurations may, but need not offer a user a choice of which of the four different combinations of pre-training procedures are performed. In yet another configuration, none of the pre-training procedures A_1, A_2, A_3, and A_4 is performed.

M_1, N_1, M_2, and N_2 define the size of an area in which initial training is performed, and:

$$0 \leq M\_1 \leq M\_2 \leq (M-1) \text{ and}$$

$$0 \leq N\_1 \leq N\_2 \leq (N-1) \quad (8)$$

(By convention, for loops in which bounds M_1 and M_2, or N_1 and N_2 are equal, the loop is executed once.)

In configurations using any of pre-training procedures A_1, A_2, A_3, and A_4, pre-training is performed over a rectangular subset of the image, which may be, but need not be, the entire image. When the subset is large, more training or learning for parameters $X_{low}(i)$, $Y_{low}(j)$, $X_{high}(i)$, and $Y_{high}(j)$ is achieved. Values of M_1, N_1, M_2, and N_2 in one configuration of the present invention are selected in accordance with a desired computational speed, because larger pre-training areas require greater computational time.

Figure 3:
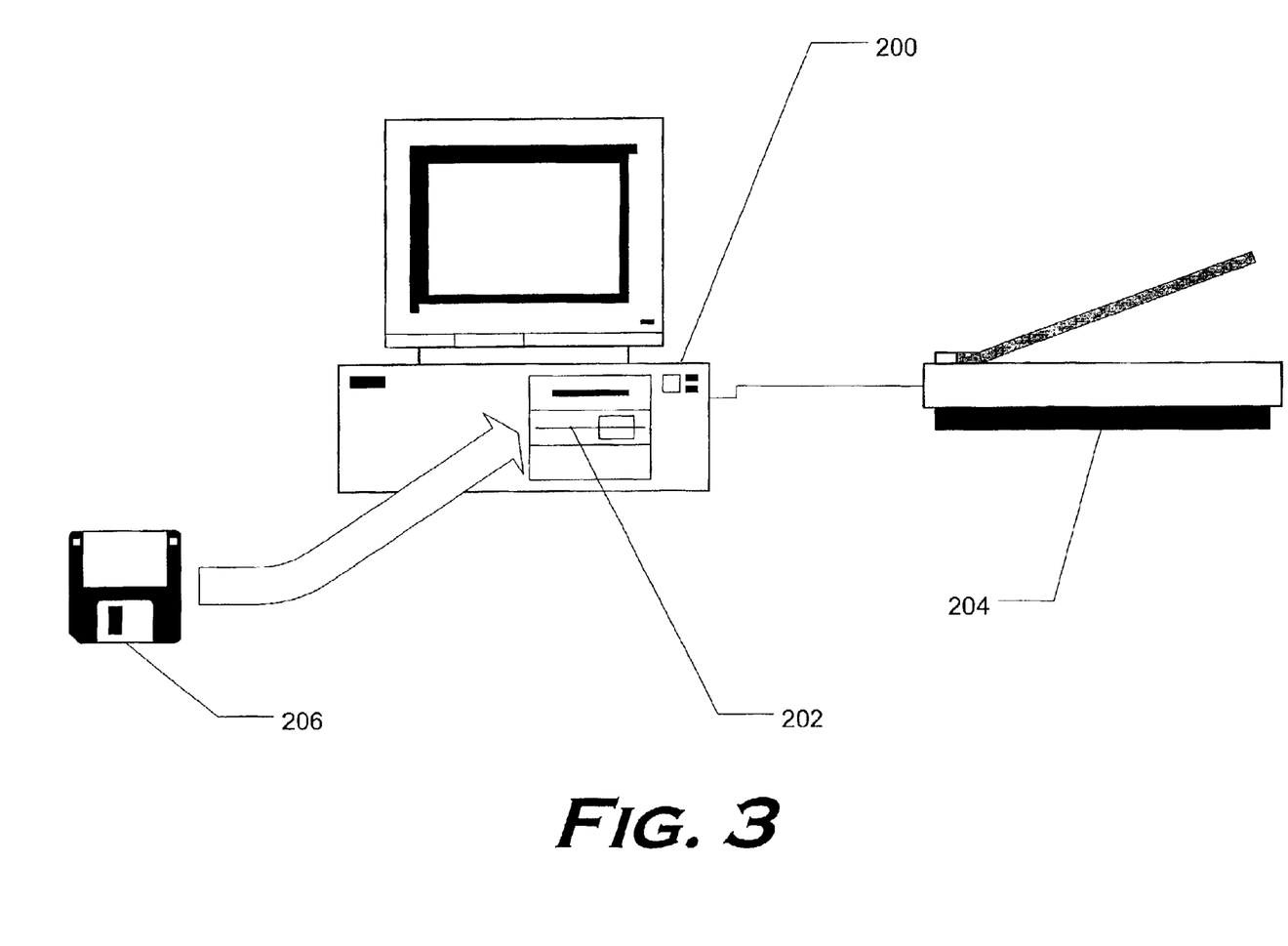
FIG. 3 is a simplified block diagram illustrating one configuration of a computing system suitable for performing the method illustrated in FIG. 1.

In one configuration of the present invention and referring to FIG. 3, a computing apparatus 200 suitable for performing the methods disclosed herein is provided. Computing apparatus 200 includes a processor and a memory operatively coupled to the processor. Neither the memory nor the processor is shown, in FIG. 3 but both are well known to those skilled in the art, as are techniques for operatively coupling the processor to the memory. The processor operates on images and variables (or arrays of variables) in the memory, and is able to store variables (or arrays of variables) in the memory or read variables (or arrays of variables) from the memory. Computing apparatus 200 also has a device configured to read instructions from an external machine-readable medium or media 206 and a scanner 204 for scanning images. In one configuration, instructions configured to instruct computing apparatus 200 to performing one or more configurations of the methods disclosed herein are recorded on medium or media 206.

Unlike methods having a predetermined threshold, configurations of the present invention utilize self-learning as the background of the image changes. Within the self-learning process, existing knowledge is accumulated and used iteratively. A threshold adjusts itself in one configuration as the process proceeds through rows and columns of a pixelized image. Therefore, configurations of the present invention work well even with uneven or textured backgrounds. In one configuration, the process trains itself, utilizing pixels of the image that have already been traversed. Resulting binarized images are particularly suitable for optical character recognition (OCR) purposes, and are processed using OCR at least one configuration of the present invention.

In yet another configuration of the present invention, binarization is performed in "real time," i.e., during scanning of an image. This configuration is similar to the configuration shown in FIG. 1 and described above, except that rather than initializing $X_{low}(i)$, $Y_{low}(j)$, $X_{high}(i)$, and $Y_{high}(j)$ as in equations 2 and 3 above, $X_{low}(i)$ and $Y_{low}(j)$ are initialized to the minimum possible pixel luminosity value and $X_{high}(i)$, and $Y_{high}(j)$ are initialized to the maximum possible pixel luminosity value. (For example, one configuration in which all luminosity values within an 8-bit integer value range are possible has a minimum possible luminosity value of 0 and a maximum possible luminosity value of 255.) In addition, the loop over variable i beginning at step 18 of FIG. 1 is be performed as each scan line of the image is acquired. No pre-training is performed, however, because the image is not available for pre-training until binarization has already occurred.

In the configurations of the present invention described above, the luminance or gray value of each image pixel is utilized for binarization. However, it is possible to consistently substitute another value (for example, an R value from an RGB representation of a pixel, or a Q value from the YIQ representation of the pixel) for the luminance or gray value in configurations tailored for special purposes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for binarizing an image having N columns and M rows of pixels and a first column forming a first edge of the image, a last column forming a second edge of the image opposite the first edge, a first row of the image forming a third edge of the image and a last row of the image forming a fourth edge of the image opposite the third edge, said method producing an array of binarized pixels, said method comprising:

(a) initializing, for each column of the image, a first variable representing a local column low pixel value and a second variable representing a local column high pixel value, and, for each row of the image, a third variable representing a local row low pixel value and a fourth variable representing a local row high pixel value;

(b) iteratively repeating steps (c) through (f) for each column of the image, from the first column to the last column;

(c) iteratively repeating steps (d) through (f) for each row of the image, from the first row to the last row;

(d) determining a threshold value dependent upon said first variable and said second variable at the column of the location index, and upon said third variable and said fourth variable at the row of the location index, the location index being dependent upon the iterated column and the iterated row;

(e) comparing a value representative of an image pixel at the location index with the determined threshold value; and (f) setting a binarization pixel for the location index to either a first value or a second value, dependent upon results of the comparison, and adjusting values of either the first variable and the third variable, or the second variable and the fourth variable dependent upon the results of the comparison.

2. A method in accordance with claim 1 wherein the image is a color image, said value representative of an image pixel is a gray scale value representative of the image pixel, and said method further comprises converting the color image to a gray scale image.

3. A method in accordance with claim 2 wherein converting the color image to a gray scale image comprises converting an image represented by an RGB representation to an image represented by a YIQ representation, and said gray scale value is a YIQ__Y (luminance) value.

4. A method in accordance with claim 2 further comprising scanning the color image to obtain the N columns and M rows of pixels.

5. A method in accordance with claim 1 further comprising performing optical character recognition on the array of binarized pixels.

6. A method in accordance with claim 1 wherein said first variable is written $X_{low}(i)$ for i=0, . . . , N−1 and said second variable is written $X_{high}(i)$ for i=0, . . . , N−1, said third variable is written $Y_{low}(j)$ for j=0, . . . , M−1 and said fourth variable is written $Y_{high}(j)$ for j=0, . . . , N−1, and further wherein adjusting values of either the first variable and the third variable, or the second variable and the fourth variable dependent upon the results of the comparison comprises adjusting either:

$$X_{low}(i)=(X_{low}(i)*w+YIQ\_Y(i,j))/(w+1)$$

$$Y_{low}(j)=(Y_{low}(j)*w+YIQ\_Y(i,j))/(w+1)$$

or:

$$X_{high}(i)=(X_{high}(i)*w+YIQ\_Y(i,j))/(w+1)$$

$$Y_{high}(j)=(Y_{high}(j)*w+YIQ\_Y(i,j))/(w+1)$$

dependent upon the results of the comparison, where:

w is a parameter,

* (asterisk) represents multiplication, i is the column of the location index, j is the row of the location index, and YIQ__Y(i,j) is a luminosity value of a pixel of the image at the location index.

7. A method in accordance with claim 6 wherein the threshold is written as:

$$T(i,j)=(X_{low}(i)+X_{high}(i)+Y_{low}(j)+Y_{high}(j))/4.$$

8. A method in accordance with claim 7 wherein initializing said first variable, second variable, third variable and fourth variable comprises setting:

$$X_{low}(i)=YIQ\_Y_{min}, i=0, \ldots, N-1$$

$$X_{high}(i)=YIQ\_Y_{max}, i=0, \ldots, N-1$$

$$Y_{low}(j)=YIQ\_Y_{min}, j=0, \ldots, M-1$$

$$Y_{high}(j)=YIQ\_Y_{max}, j=0, \ldots, M-1,$$

where:

$$YIQ\_Y_{min}=\text{minimum}\{YIQ\_Y(i,j)\}, i=0, \ldots, N-1, j=0, \ldots, M-1$$

$$YIQ\_Y_{max}=\text{maximum}\{YIQ\_Y(i,j)\}, i=0, \ldots, N-1, j=0, \ldots, M-1.$$

9. A method in accordance with claim 8 further comprising pretraining values of $X_{low}(i)$, $X_{high}(i)$, $Y_{low}(j)$, and $Y_{high}(j)$, utilizing a first pre-training procedure selected from the group consisting of A_1 and A_2, and a second pre-training procedure selected from the group consisting of A_3 and A_4, wherein pre-training procedure A_1 is written:

A_1: for i=N_1 to i=N_2
    for j=M_1 to j=M_2
        if YIQ_Y(i,j)<($X_{low}$(i)+$X_{high}$(i))/2
          then $X_{low}$(i)=($X_{low}$(i)*w+YIQ_Y(i,j))/(w+1)
          else $X_{high}$(i)=($X_{high}$(i)*w+YIQ_Y(i,j))/(W+1)

pre-training procedure A_2 is written:

A_2: for i=N_2 down to i=N_1
    for j=M_2 down to j=M_1
        if YIQ_Y(i,j)<($X_{low}$(i)+$X_{high}$(i))/2
          then $X_{low}$(i)=($X_{low}$(i)*w+YIQ_Y(i,j))/(w+1)
          else $X_{high}$(i)=($X_{high}$(i)*w+YIQ_Y(i,j))/(w+1)

pre-training procedure A_3 is written

A_3: for i=N_1 to i=N_2
    for j=M_1 to j=M_2
        if YIQ_Y(i,j)<($Y_{low}$(i)+$Y_{high}$(i))/2
          then $Y_{low}$(j)=($Y_{low}$(j)*w+YIQ_Y(i,j))/(w+1)
          else $Y_{high}$(j)=($Y_{high}$(j)*w+YIQ_Y(i,j))/(w+1)

and pre-training procedure A_4 is written

A_4: for i=N_2 down to i=N_1
    for j=M_2 down to j=M_1
        if YIQ_Y(i,j)<($Y_{low}$(i)+$Y_{high}$(i))/2
          then $Y_{low}$(j)=($Y_{low}$(j)*w+YIQ_Y(i,j))/(w+1)
          else $Y_{high}$(j)=($Y_{high}$(j)*w+YIQ_Y(i,j))/(w+1)

wherein:

$$0 \leq M\_1 \leq M\_2 \leq (M-1) \text{ and}$$

$$0 \leq N\_1 \leq N\_2 \leq (N-1).$$

10. A method in accordance with claim 8 further comprising pre-training values of $X_{low}(i)$, $X_{high}(i)$, $Y_{low}(j)$, and $Y_{high}(j)$, utilizing four pre-training procedures A_1, A_2, A_3 and A_4, wherein pre-training procedure A_1 is written:

A_1: for i=N_1 to i=N_2
    for j=M_1 to j=M_2
        if YIQ_Y(i,j)<($X_{low}$(i)+$X_{high}$(i))/2
          then $X_{low}$(i)=($X_{low}$(i)*w+YIQ_Y(i,j))/(w+1)
          else $X_{high}$(i)=($X_{high}$(i)*w+YIQ_Y(i,j))/(w+1)

pre-training procedure A_2 is written:

A_2: for i=N_2 down to i=N_1
    for j=M_2 down to j=M_1
        if YIQ_Y(i,j)<($X_{low}$(i)+$X_{high}$(i))/2
          then $X_{low}$(i)=($X_{low}$(i)*w+YIQ_Y(i,j))/(w+1)
          else $X_{high}$(i)=($X_{high}$(i)*w+YIQ_Y(i,j))/(w+1)

pre-training procedure A_3 is written

A_3: for i=N_1 to i=N_2
    for j=M_1 to j=M_2
        if YIQ_Y(i,j)<($Y_{low}$(i)+$Y_{high}$(i))/2
          then $Y_{low}$(j)=($Y_{low}$(j)*w+YIQ_Y(i,j))/(w+1)
          else $Y_{high}$(j)=($Y_{high}$(j)*w+YIQ_Y(i,j))/(w+1)

and pre-training procedure A_4 is written

A_4: for i=N_2 down to i=N_1
    for j=M_2 down to j=M_1
        if YIQ_Y(i,j)<($Y_{low}$(i)+$Y_{high}$(i))/2
          then $Y_{low}$(j)=($Y_{low}$(j)*w+YIQ_Y(i,j))/(w+1)
          else $Y_{high}$(j)=($Y_{high}$(j)*w+YIQ_Y(i,j))/(w+1), wherein:

$$0 \leq M\_1 \leq M\_2 \leq (M-1) \text{ and}$$

$$0 \leq N\_1 \leq N\_2 \leq (N-1).$$

11. A computing apparatus for binarizing an image having N columns and M rows of pixels and a first column forming a first edge of the image, a last column forming a second edge of the image opposite the first edge, a first row of the image forming a third edge of the image and a last row of the image forming a fourth edge of the image, said computing apparatus comprising a memory and a processor operatively coupled to said memory for reading and storing values therein;

said computing apparatus configured to:

(a) initialize in said memory, for each column of the image, a first variable representing a local low first direction pixel value and a second variable representing a local high first direction pixel value, and, for each row of the image, a third variable representing a local low second direction pixel value and a fourth variable representing a local high second direction pixel value;

(b) iteratively repeat (c) through (f) for each column of the image, from the first column to the last column;

(c) iteratively repeat (d) through (f) for each row of the image, from the first row to the last row;

(d) determine a threshold value dependent upon said first variable and said second variable at the column of the location index, and upon said third variable and said fourth variable at the row of a location index, the location index being dependent upon the iterated column and the iterated row;

(e) compare a value representative of an image pixel at the location index with the determined threshold value; and (f) store, in said memory, a binarization pixel for the location index to either a first value or a second value, dependent upon results of the comparison, and adjust stored values of either the first variable and the third variable, or the second variable and the fourth variable dependent upon the results of the comparison, wherein said iterations (b) and (c) produce an array of binarization pixels stored in said memory.

12. An apparatus in accordance with claim 11 wherein the image is a color image, said value representative of an image pixel is a gray scale value representative of the image pixel, and said apparatus is further configured to convert the color image to a gray scale image.

13. An apparatus in accordance with claim 12 wherein to convert the color image to a gray scale image, said apparatus is configured to convert an image represented by an RGB representation to an image represented by a YIQ representation, and said gray scale value is a YIQ_Y (luminance) value.

14. An apparatus in accordance with claim 12 further comprising a scanner, and wherein said apparatus is further configured to scan the color image to obtain the N columns and M rows of pixels of the color image.

15. An apparatus in accordance with claim 11 further configured to perform optical character recognition on said array of binarized pixels.

16. An apparatus in accordance with claim 11 wherein said first variable is written $X_{low}(i)$ for i=0, . . . , N−1 and said second variable is written $X_{high}(i)$ for i=0, . . . , N−1, said third variable is written $Y_{low}(j)$ for j=0, . . . , M−1 and said fourth variable is written $Y_{high}(j)$ for j=0, . . . , N−1, and further wherein to adjust values of either the first variable and the third variable, or the second variable and the fourth variable dependent upon the results of the comparison, said apparatus is configured to adjust either:

$$X_{low}(i)=(X_{low}(i)*w+YIQ\_Y(i,j))/(w+1)$$

$$Y_{low}(j)=(Y_{low}(j)*w+YIQ\_Y(i,j))/(w+1)$$

or:

$$X_{high}(i)=(X_{high}(i)*w+YIQ\_Y(i,j))/(w+1)$$

$$Y_{high}(j)=(Y_{high}(j)*w+YIQ\_Y(i,j))/(w+1)$$

dependent upon the results of the comparison, where:
w is a parameter,
* (asterisk) represents multiplication,
i is the column of the location index,
j is the row of the location index, and
YIQ_Y(i,j) is a luminosity value of a pixel of the image at the location index.

17. An apparatus in accordance with claim 16 wherein the threshold is written as:

$$T(i,j)=(X_{low}(i)+X_{high}(i)+Y_{low}(j)+Y_{high}(j))/4.$$

18. An apparatus in accordance with claim 17 wherein to initialize said first variable $X_{low}(i)$, said second variable $X_{high}(i)$, said third variable $Y_{low}(j)$ and said fourth variable $Y_{high}(j)$, said apparatus is configured to store in said memory, the values:

$$X_{low}(i)=YIQ\_Y_{min},\ i=0,\ldots,N-1$$

$$X_{high}(i)=YIQ\_Y_{max},\ i=0,\ldots,N-1$$

$$Y_{low}(j)=YIQ\_Y_{min},\ j=0,\ldots,M-1$$

$$Y_{high}(j)=YIQ\_Y_{max},\ j=0,\ldots,M-1$$

where:

$$YIQ\_Y_{min}=\text{minimum}\{YIQ\_Y(i,j)\},\ i=0,\ldots,N-1,\ j=0,\ldots,M-1$$

$$YIQ\_Y_{max}=\text{maximum}\{YIQ\_Y(i,j)\},\ i=0,\ldots,N-1,\ j=0,\ldots,M-1.$$

19. An apparatus in accordance with claim 18 further configured to pretrain values of $X_{low}(i)$, $X_{high}(i)$, $Y_{low}(j)$, and $Y_{high}(j)$ stored in said memory utilizing a first pre-training procedure selected from the group consisting of A_1 and A_2, and a second pre-training procedure selected from the group consisting of A_3 and A_4, wherein pre-training procedure A_1 is written:

A_1: for i=N_1 to i=N_2
  for j=M_1 to j=M_2
    if YIQ_Y(i,j)<($X_{low}(i)+X_{high}(i)$)/2
      then $X_{low}(i)=(X_{low}(i)*w+YIQ\_Y(i,j))/(w+1)$
      else $X_{high}(i)=(X_{high}(j)*w+YIQ\_Y(i,j))/(w+1)$ pre-training procedure A_2 is written:

A_2: for i=N_2 down to i=N_1
  for j=M_2 down to j=M_1
    if YIQ_Y(i,j)<($X_{low}(i)+X_{high}(i)$)/2
      then $X_{low}(i)=(X_{low}(i)*w+YIQ\_Y(i,j))/(w+1)$
      else $X_{high}(i)=(X_{high}(i)*w+YIQ\_Y(i,j))/(w+1)$ pre-training procedure A_3 is written A_3: for i=N_1 to i=N_2
  for j=M_1 to j=M_2
    if YIQ_Y(i,j)<($Y_{low}(i)+Y_{high}(i)$)/2
      then $Y_{low}(j)=(Y_{low}(j)*w+YIQ\_Y(i,j))/(w+1)$
      else $Y_{high}(j)=(Y_{high}(j)*w+YIQ\_Y(i,j))/(w+1)$ and pre-training procedure A_4 is written A_4: for i=N_2 down to i=N_1
  for j=M_2 down to j=M_1
    if YIQ_Y(i,j)<($Y_{low}(i)+Y_{high}(i)$)/2
      then $Y_{low}(j)=(Y_{low}(j)*w+YIQ\_Y(i,j))/(w+1)$
      else $Y_{high}(j)=(Y_{high})*w+YIQ\_Y(i,j))/(W+1)$, wherein:

$$0\leq M\_1\leq M\_2\leq(M-1)\text{ and}$$

$$0\leq N\_1\leq N\_2\leq(N-1).$$

20. An apparatus in accordance with claim 18 further configured to pretrain values of $X_{low}(i)$, $X_{high}(i)$, $Y_{low}(j)$, and $Y_{high}(j)$ stored in said memory utilizing four pre-training procedures A_1, A_2, A_3 and A_4, wherein pre-training procedure A_1 is written:

A_1: for i=N_1 to i=N_2
  for j=M_1 to j=M_2
    if YIQ_Y(i,j)<($X_{low}(i)+X_{high}(i)$)/2
      then $X_{low}(i)=(X_{low}(i)*w+YIQ\_Y(i,j))/(w+1)$
      else $X_{high}(i)=(X_{high}(i)*w+YIQ\_Y(i,j))/(w+1)$ pre-training procedure A_2 is written:

A_2: for i=N_2 down to i=N_1
  for j=M_2 down to j=M_1
    if YIQ_Y(i,j)<($X_{low}(i)+X_{high}(i)$)/2
      then $X_{low}(i)=(X_{low}(i)*w+YIQ\_Y(i,j))/(w+1)$
      else $X_{high}(i)=(X_{high}(i)*w+YIQ\_Y(i,j))/(w+1)$ pre-training procedure A_3 is written A_3: for i=N_1 to i=N_2
  for j=M_1 to j=M_2
    if YIQ_Y(i,j)<($Y_{low}(i)+Y_{high}(i)$)/2
      then $Y_{low}(j)=(Y_{low}(j)*w+YIQ\_Y(i,j))/(w+1)$
      else $Y_{high}(j)=(Y_{high}(j)*w+YIQ\_Y(i,j))/(w+1)$ and pre-training procedure A_4 is written A_4: for i=N_2 down to i=N_1
  for j=M_2 down to j=M_1
    if YIQ_Y(i,j)<($Y_{low}(i)+Y_{high}(i)$)/2
      then $Y_{low}(j)=(Y_{low}(j)*w+YIQ\_Y(i,j))/(w+1)$
      else $Y_{high}(j)=(Y_{high}(j)*w+YIQ\_Y(i,j))/(w+1)$, wherein:

$$0\leq M\_1\leq M\_2\leq(M-1)\text{ and}$$

$$0\leq N\_1\leq N\_2\leq(N-1).$$

21. A machine readable medium or media having recorded thereon instructions configured to instruct a computing apparatus having a memory and a processor operatively coupled to the memory for reading and storing values therein to:
  (a) initialize in the memory, for each column of an image having N columns and M rows of pixels and a first column forming a first edge of the image, a last column forming a second edge of the image opposite the first edge, a first row of the image forming a third edge of the image and a last row of the image forming a fourth edge of the image, a first variable representing a local low first direction pixel value and a second variable representing a local high first direction pixel value, and, for each row of the image, a third variable representing a local low second direction pixel value and a fourth variable representing a local high second direction pixel value;
  (b) iteratively repeat (c) through (f) for each column of the image, from the first column to the last column;
  (c) iteratively repeat (d) through (f) for each row of the image, from the first row to the last row;
  (d) determine a threshold value dependent upon said first variable and said second variable at the column of the location index, and upon said third variable and said fourth variable at the row of a location index, the location index being dependent upon the iterated column and the iterated row;
  (e) compare a value representative of an image pixel at the location index with the determined threshold value; and
  (f) store, in the memory, a binarization pixel for the location index to either a first value or a second value, dependent upon results of the comparison, and adjust stored values of either the first variable and the third variable, or the second variable and the fourth variable dependent upon the results of the comparison,
  wherein the iterations (b) and (c) produce an array of binarization pixels stored in the memory.

22. A medium or media in accordance with claim 21 wherein the image is a color image, said value representative of an image pixel is a gray scale value representative of the image pixel, and wherein said medium or media further have recorded therein instructions configured to instruct the computing apparatus to convert the color image to a gray scale image.

23. A medium or media in accordance with claim 22 wherein to convert the color image to a gray scale image, said medium or media has recorded therein instructions configured to instruct the computing apparatus to: convert an image represented by an RGB representation to an image represented by a YIQ representation, wherein said gray scale value is a YIQ_Y (luminance) value.

24. A medium or media in accordance with claim 22 further having recorded thereon instructions configured to scan the color image utilizing a scanner to obtain the N columns and M rows of pixels of the color image.

25. A medium or media in accordance with claim 21 further having recorded thereon instructions configured to instruct the computing apparatus to perform optical character recognition on said array of binarized pixels.

26. A medium or media in accordance with claim 21 wherein said first variable is written $X_{low}(i)$ for $i=0,\ldots,N-1$ and said second variable is written $X_{high}(i)$ for $i=0,\ldots,N-1$, said third variable is written $Y_{low}(j)$ for $j=0,\ldots,M-1$ and said fourth variable is written $Y_{high}(j)$ for $j=0,\ldots,N-1$, and further wherein to adjust values of either the first variable and the third variable, or the second variable and the fourth variable dependent upon the results of the comparison, said medium or media has recorded thereon instructions configured to instruct the computing apparatus to adjust either:

$$X_{low}(i)=(X_{low}(i)*w+YIQ\_Y(i,j))/(w+1)$$

$$Y_{low}(j)=(Y_{low}(j)*w+YIQ\_Y(i,j))/(w+1)$$

or:

$$X_{high}(i)=(X_{high}(i)*w+YIQ\_Y(i,j))/(w+1)$$

$$Y_{high}(j)=(Y_{high}(j)*w+YIQ\_Y(i,j))/(w+1)$$

dependent upon the results of the comparison, where:
  w is a parameter,
  * (asterisk) represents multiplication,
  i is the column of the location index,
  j is the row of the location index, and
  $YIQ\_Y(i,j)$ is a luminosity value of a pixel of the image at the location index.

27. A medium or media in accordance with claim 26 wherein the threshold is written as:

$$T(i,j)=(X_{low}(i)+X_{high}(i)+Y_{low}(j)+Y_{high}(j))/4.$$

28. A medium or media in accordance with claim 27 wherein to initialize said first variable $X_{low}(i)$, said second variable $X_{high}(i)$, said third variable $Y_{low}(j)$ and said fourth variable $Y_{high}(j)$, said medium or media have recorded thereon instructions configured to instruct the computing apparatus to store in the memory the values:

$$X_{low}(i)=YIQ\_Y_{min}, i=0,\ldots,N-1$$

$$X_{high}(i)=YIQ\_Y_{max}, i=0,\ldots,N-1$$

$$Y_{low}(j)=YIQ\_Y_{min}, j=0,\ldots,M-1$$

$$Y_{high}(j)=YIQ\_Y_{max}, j=0,\ldots,M-1,$$

where:

$$YIQ\_Y_{min}=\text{minimum}\{YIQ\_Y(i,j)\}, i=0,\ldots,N-1, j=0,\ldots,M-1$$

$$YIQ\_Y_{max}=\text{maximum}\{YIQ\_Y(i,j)\}, i=0,\ldots,N-1, j=0,\ldots,M-1.$$

29. A medium or media in accordance with claim 28 further having recorded thereon instructions configured to instruct the computing apparatus to pre-train values of $X_{low}(i)$, $X_{high}(i)$, $Y_{low}(j)$, and $Y_{high}(j)$ stored in the memory utilizing a first pre-training procedure selected from the group consisting of A_1 and A_2, and a second pre-training procedure selected from the group consisting of A_3 and A_4, wherein pre-training procedure A_1 is written:
  A_1: for i=N_1 to i=N_2
    for j=M_1 to j=M_2
      if $YIQ\_Y(i,j)<(X_{low}(i)+X_{high}(i))/2$
        then $X_{low}(i)=(X_{low}(i)*w+YIQ\_Y(i,j))/(w+1)$
        else $X_{high}(i)=(X_{high}(i)*w+YIQ\_Y(i,j))/(w+1)$
  pre-training procedure A_2 is written:
  A_2: for i=N_2 down to i=N_1
    for j=M_2 down to j=M_1
      if $YIQ\_Y(i,j)<(X_{low}(i)+X_{high}(i))/2$
        then $X_{low}(i)=(X_{low}(i)*w+YIQ\_Y(i,j))/(w+1)$
        else $X_{high}(i)=(X_{high}(i)*w+YIQ\_Y(i,j))/(w+1)$ pre-training procedure A_3 is written A_3: for i=N_1 to i=N_2
    for j=M_1 to j=M_2
        if $YIQ\_Y(i,j) < (Y_{low}(i)+Y_{high}(i))/2$
            then $Y_{low}(j) = (Y_{low}(j)*w + YIQ\_Y(i,j))/(w+1)$
            else $Y_{high}(j) = (Y_{high}(j)*w + YIQ\_Y(i,j))i(w+1)$ and pre-training procedure A_4 is written A_4: for i=N_2 down to i=N_1
    for j=M_2 down to j=M_1
        if $YIQ\_Y(i,j) < (Y_{low}(i)+Y_{high}(i))/2$
            then $Y_{low}(j) = (Y_{low}(j)*w + YIQ\_Y(i,j))/(w+1)$
            else $Y_{high}(j) = (Y_{high}(j)*w + YIQ\_Y(i,j))/(w+1)$, wherein:

$$0 \leq M\_1 \leq M\_2 \leq (M-1) \text{ and}$$

$$0 \leq N\_1 \leq N\_2 \leq (N-1).$$

30. A medium or media in accordance with claim 28 further having recorded thereon instructions configured to instruct the computing apparatus to pre-train values of $X_{low}(i)$, $X_{high}(i)$, $Y_{low}(j)$, and $Y_{high}(j)$ stored in said memory utilizing four pre-training procedures A_1, A_2, A_3 and A_4, wherein pre-training procedure A_1 is written:

A_1: for i=N_1 to i=N_2
    for j=M_1 to j=M_2
        if $YIQ\_Y(i,j) < (X_{low}(i)+X_{high}(i))/2$
            then $X_{low}(i) = (X_{low}(i)*w + YIQ\_Y(i,j))/(w+1)$
            else $X_{high}(i) = (X_{high}(i)*w + YIQ\_Y(i,j))/(w+1)$ pre-training procedure A_2 is written:

A_2: for i=N_2 down to i=N_1
    for j=M_2 down to j=M_1
        if $YIQ\_Y(i,j) < (X_{low}(i)+X_{high}(i))/2$
            then $X_{low}(i) = (X_{low}(i)*w + YIQ\_Y(i,j))/(w+1)$
            else $X_{high}(i) = (X_{high}(i)*w + YIQ\_Y(i,j))/(w+1)$ pre-training procedure A_3 is written A_3: for i=N_1 to i=N_2
    for j=M_1 to j=M_2
        if $YIQ\_Y(i,j) < (Y_{low}(i)+Y_{high}(i))/2$
            then $Y_{low}(j) = (Y_{low}(j)*w + YIQ\_Y(i,j))/(w+1)$
            else $Y_{high}(j) = (Y_{high}(j)*w + YIQ\_Y(i,j))/(w+1)$ and pre-training procedure A_4 is written A_4: for i=N_2 down to i=N_1
    for j=M_2 down to j=M_1
        if $YIQ\_Y(i,j) < (Y_{low}(i)+Y_{high}(i))/2$
            then $Y_{low}(j) = (Y_{low}(j)*w + YIQ\_Y(i,j))/(w+1)$
            else $Y_{high}(j) = (Y_{high}(j))(j)*w + YIQ\_Y(i,j))/(w+1)$, wherein:

$$0 \leq M\_1 \leq M\_2 \leq (M-1) \text{ and}$$

$$0 \leq N\_1 \leq N\_2 \leq (N-1).$$

\* \* \* \* \*

UNITED STATES PATENT AND TRADEMARK OFFICE
CERTIFICATE OF CORRECTION

PATENT NO. : 6,950,210 B2
DATED : September 27, 2005
INVENTOR(S) : Jinhong K. Guo et al.

It is certified that error appears in the above-identified patent and that said Letters Patent is hereby corrected as shown below:

Column 9,
Line 32, "(W+1)" should be -- (w+1) --.
Line 43, "(i)/2" should be -- (i))/2 --.
Lines 55 and 56, all occurrences of "≦" should be -- ≤ --.

Column 10,
Lines 21 and 22, all occurrences of "≦" should be -- ≤ --.

Column 12,
Line 9, "($X_{high}$(j)" should be -- ($X_{high}$(i) --.
Line 27, "($Y_{high}$(j)/2" should be -- $Y_{high}$(i))/2 --.
Line 28, "($Y_{high}$)" (second occurrence) should be -- $Y_{high}$(j) --.
Line 29, "(W+1)" should be -- (w+1) --.
Lines 31, 32, 66 and 67, (all occurrences) "≦" should be -- ≤ --.

Column 15,
Line 6, "Y(i,j))i(w+1)" should be -- Y(i,j))/(w+1) --.
Lines 16, 17, 25 and 26, (all occurrences) "≦" should be -- ≤ --.

Signed and Sealed this

Thirty-first Day of January, 2006

JON W. DUDAS
*Director of the United States Patent and Trademark Office*